US011471827B2

(12) United States Patent
Tosi et al.

(10) Patent No.: US 11,471,827 B2
(45) Date of Patent: Oct. 18, 2022

(54) APPARATUS AND METHOD FOR THE GAS TREATMENT

(71) Applicant: BRENNERO INNOVAZIONI TECNOLOGICHE S.r.l., Trento (IT)

(72) Inventors: Paolo Tosi, Trento (IT); Luca Matteo Martini, Trento (IT); Giorgio Dilecce, Trento (IT)

(73) Assignee: BRENNERO INNOVAZIONI TECNOLOGICHE S.r.l., Trento (IT)

( * ) Notice: Subject to any disclaimer, the term of this patent is extended or adjusted under 35 U.S.C. 154(b) by 489 days.

(21) Appl. No.: 16/494,353

(22) PCT Filed: Mar. 16, 2018

(86) PCT No.: PCT/IB2018/051764
§ 371 (c)(1),
(2) Date: Sep. 16, 2019

(87) PCT Pub. No.: WO2018/167722
PCT Pub. Date: Sep. 20, 2018

(65) Prior Publication Data
US 2020/0129921 A1 Apr. 30, 2020

(30) Foreign Application Priority Data

Mar. 16, 2017 (IT) ........................ 102017000029528

(51) Int. Cl.
*B01D 53/32* (2006.01)
*B01D 3/14* (2006.01)
(Continued)

(52) U.S. Cl.
CPC ............ *B01D 53/32* (2013.01); *B01D 3/143* (2013.01); *B01D 53/229* (2013.01); *B01D 53/62* (2013.01);
(Continued)

(58) Field of Classification Search
CPC ...... B01D 53/32; B01D 3/143; B01D 53/229; B01D 53/62; B01D 2256/16;
(Continued)

(56) References Cited

U.S. PATENT DOCUMENTS 6,245,309 B1    6/2001  Etievant
2003/0141182 A1*  7/2003  Kong ..................... B01J 19/088
                                              204/170

(Continued)

FOREIGN PATENT DOCUMENTS

WO    WO 2009/048242 A2    4/2009
WO    WO 2010/056460 A2    5/2010
(Continued)

*Primary Examiner* — Xiuyu Tai
(74) *Attorney, Agent, or Firm* — Aslan Law, P.C.

(57) ABSTRACT

An apparatus for the gas treatment including a reaction chamber. The reaction chamber including an inlet opening of a flow of gas to be treated; means for the formation of ionizing electrical discharges adapted to interact with the gas to be treated to form a plasma state for obtaining a flow of treated gas which includes at least a high-added value fraction and at least a waste fraction; an outlet opening of the high-added value fraction arranged downstream of the means for the formation with respect to the direction of forward movement of the flow of gas to be treated inside the reaction chamber; reintroduction means for reintroducing the waste fraction inside the reaction chamber, and the reintroduction means being arranged downstream of the means for the formation with respect to the direction of forward movement.

15 Claims, 2 Drawing Sheets

(51) Int. Cl.
*B01D 53/22* (2006.01)
*B01D 53/62* (2006.01)

(52) U.S. Cl.
CPC ...... *B01D 2256/16* (2013.01); *B01D 2256/24* (2013.01); *B01D 2257/502* (2013.01); *B01D 2257/504* (2013.01); *B01D 2258/0283* (2013.01); *B01D 2259/818* (2013.01)

(58) Field of Classification Search
CPC .......... B01D 2256/24; B01D 2257/502; B01D 2257/504; B01D 2258/0283; B01D 2259/818; B01D 46/0027; B01D 53/38; B01D 53/78; B01D 2252/103; B01D 2258/02; B01D 2257/70; Y02C 20/40; C01B 3/342; C01B 2203/0861; B03C 3/38; H05H 1/2406; H05H 2245/50; H05H 1/2418; H05H 1/2465; H05H 1/24; H05H 1/245; H05H 2245/17; H05H 2240/20; C10G 32/02; C10G 65/12; C10G 47/12; C10G 69/02; C10G 15/08; C10G 45/04; C07C 27/12; C07C 29/50; B01J 2208/025; B01J 2219/0884; B01J 2219/083; B01J 2219/0809; B01J 2219/0875; B01J 2219/0892; B01J 2219/0894; B01J 2219/0871; B01J 2219/0841; B01J 2219/00135; B01J 2219/0843; B01J 19/123; B01J 19/088; B01J 19/2415; B01J 2219/0869
See application file for complete search history.

(56) References Cited

U.S. PATENT DOCUMENTS

| | | |
|---|---|---|
| 2008/0014130 A1 | 1/2008 | Santilli |
| 2011/0011728 A1 | 1/2011 | Sackinger |
| 2011/0162958 A1* | 7/2011 | Cho ..................... H05H 1/2406 204/173 |
| 2017/0056820 A1* | 3/2017 | Fabbri ................ B01D 46/0027 |

FOREIGN PATENT DOCUMENTS

| | | |
|---|---|---|
| WO | WO 2014/109458 A1 | 7/2014 |
| WO | WO 2015/125016 A1 | 8/2015 |

* cited by examiner

APPARATUS AND METHOD FOR THE GAS TREATMENT

CROSS-REFERENCE TO RELATED APPLICATIONS

This application claims priority to IT Patent Application No. 102017000029528 filed on Mar. 16, 2017, and to PCT Application No. PCT/IB2018/051764 filed on Mar. 16, 2018, the entire contents of which are hereby incorporated by reference.

TECHNICAL FIELD

The present invention relates to an apparatus and a method for gas treatment.

BACKGROUND ART

As is known, the need continues, even now, to be particularly felt to meet the constantly increasing demand for energy and, at the same time, reduce its negative impact on the environment.

In this respect, there is a widespread need to treat gases containing pollutants from combustion plants.

Equally important, both from an economic and environmental point of view, is the reduction of carbon dioxide contained in the exhaust gases mentioned above.

For obvious environmental reasons, these pollutants must be disposed of before the gas is released into the atmosphere, or alternatively treated in order to be converted into usable gases such as e.g. syngas, or into products with high added value.

As is known, syngas is a mixture of carbon monoxide and hydrogen and is produced by means of a process of thermal transformation of the original fuel, e.g., coal, which generally involves a drying, pyrolysis and gasification phase.

The above production process is carried out in reactors which are, however, very bulky and have high investment, operating and maintenance costs.

Other devices of known type are described in patent documents no. WO 2009/048242, WO 2015/125016, US 2011/011728, WO 2010/056460.

DESCRIPTION OF THE INVENTION

The main aim of the present invention is to provide an apparatus and a method for gas treatment that allows producing syngas, hydrocarbons or other compounds with high added value starting from polluting mixtures and deriving from combustion gases.

Within this aim, one object of the present invention is to provide an apparatus and a method for gas treatment which have reduced investment, operating and maintenance costs with respect to the methods and equipment of the known type used to date.

A further object of the present invention is to provide an apparatus and a method for gas treatment which allows considerably reducing the emissions of carbon dioxide into the atmosphere.

Another object of the present invention is to provide an apparatus and a method for gas treatment which allows overcoming the aforementioned drawbacks of the prior art within the scope of a simple, rational, easy, efficient to use and cost-effective solution.

The aforementioned objects are achieved by the present apparatus and method for gas treatment having the characteristics of claims 1 and 7.

BRIEF DESCRIPTION OF THE DRAWINGS

Other characteristics and advantages of the present invention will become more evident from the description of a preferred, but not exclusive embodiment of an apparatus and a method for gas treatment, illustrated by way of an indicative, but non-limiting example, in the attached drawings in which.

EMBODIMENTS OF THE INVENTION

Figure 1:
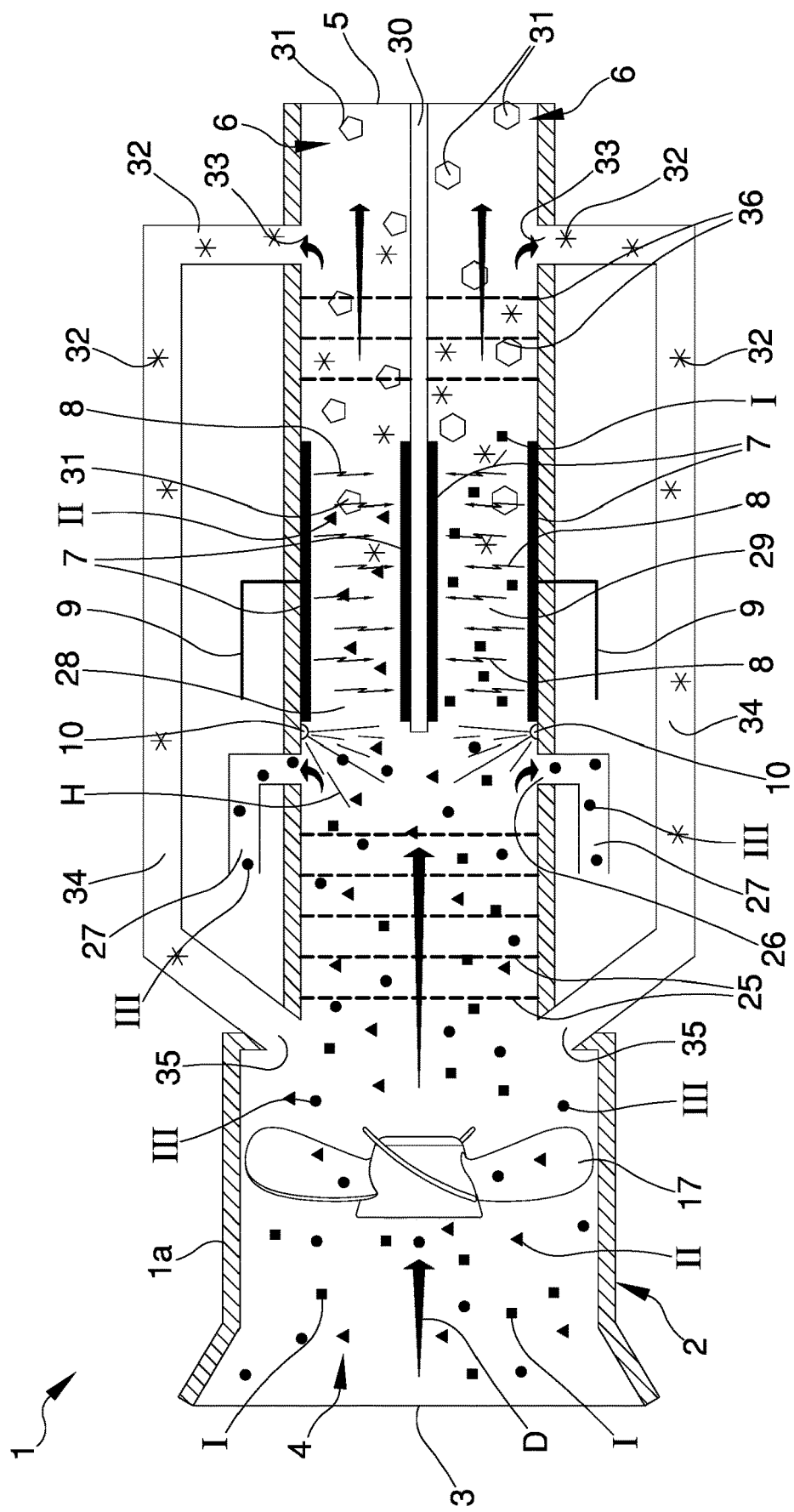
FIG. 1 is a front sectional view of the apparatus according to the invention.
Figure 2:
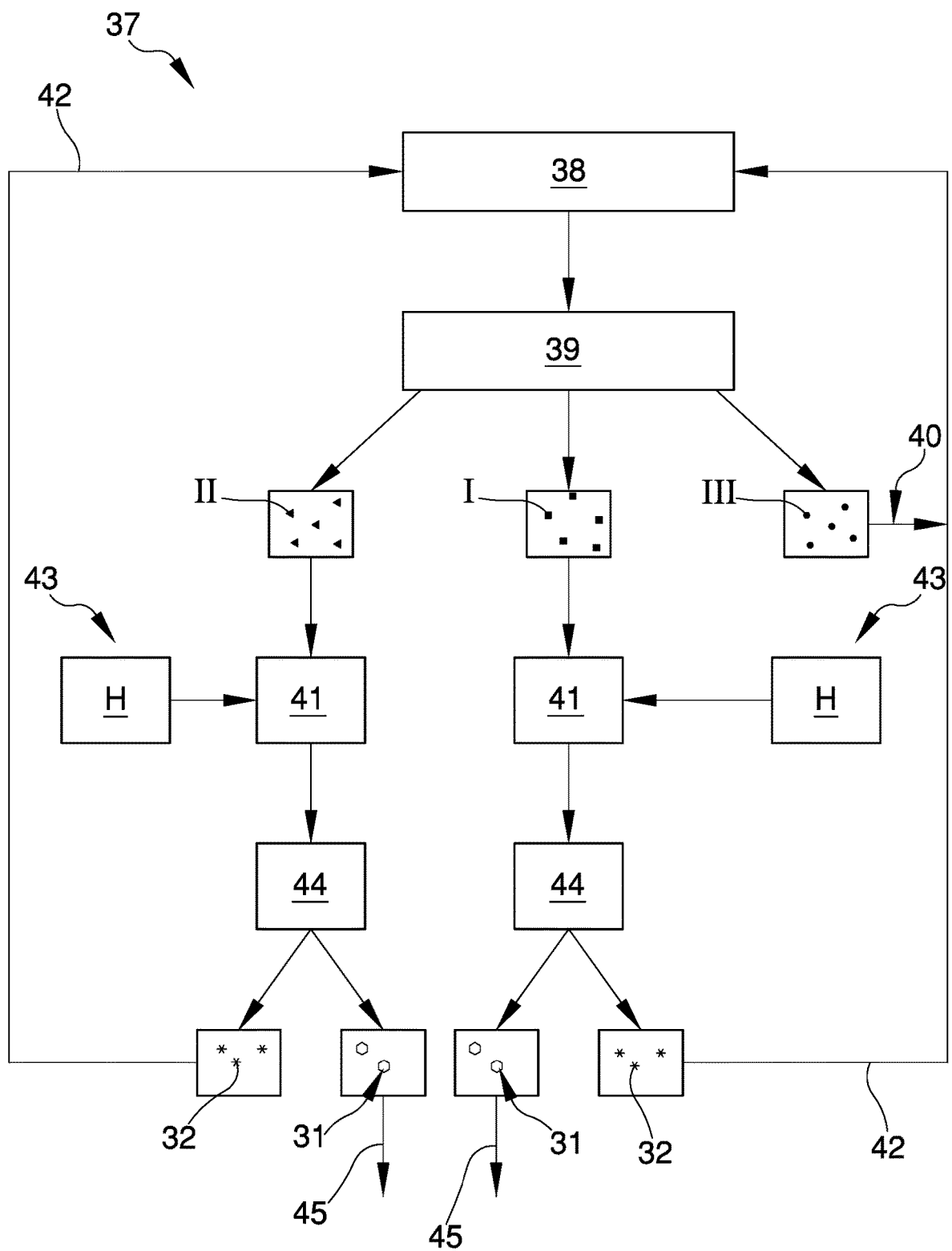
FIG. 2 is a schematic representation of the method according to the invention.

With particular reference to these illustrations, reference numeral 1 globally indicates an apparatus for gas treatment.

The apparatus 1 comprises a casing 1a comprising a reaction chamber 2 provided with an inlet opening 3 of a flow of gas to be treated 4.

Preferably, the flow of gas to be treated 4 comprises at least one of carbon dioxide I, carbon monoxide II, nitrogen III or mixtures thereof.

In the remainder of this treatise, reference is made, by way of example, to a flow of gas to be treated 4 comprising at least carbon dioxide I, carbon monoxide II and nitrogen III.

Nevertheless, alternative embodiments cannot be ruled out whereby the gas to be treated 4 is of the type of a combustion gas resulting from the combustion of methane, or biogas.

Alternative embodiments cannot also be ruled out in which the flow of gas to be treated 4 comprises only nitrogen.

Furthermore, alternative embodiments cannot be ruled out in which the flow of gas to be treated 4 comprises alternatively carbon monoxide II, or carbon dioxide I.

The flow of gas to be treated 4 is therefore transformed into a flow of treated gas 6 comprising a high-added value fraction 31 and a waste fraction 32.

In this regard, the reaction chamber 2 comprises an outlet opening 5 of the high-added value fraction 31.

It should be specified that in this treatise, the term "high-added value fraction" means a finished product obtained from the transformation of the flow of gas to be treated 4 and which, compared to the latter, has a higher industrial value, i.e. has a wide range of uses in such field.

Preferably, the high-added value fraction 31 is selected from the group comprising: syngas, hydrocarbons, oxygenated compounds, nitrogen compounds, and hydrogen.

In other words, the high-added value fraction 31 consists of a finished product selected from the group consisting of syngas, hydrocarbons, oxygenated compounds, nitrogen compounds, and hydrogen.

For example, the oxygenated compounds comprise alcohols such as methanol, or esters, or dimethylether, and the nitrogen compounds are of the ammonium nitrate type.

Advantageously, the waste fraction 32 comprises at least carbon dioxide and carbon monoxide.

At the same time, by the term "waste fraction" 32 is meant a surplus fraction with respect to the fraction of the high-added value fraction 31.

In detail, the gas to be treated 4 is introduced inside the body 2 through the inlet opening 3 substantially in the axial direction defining a direction of forward movement, identified by the arrow D, inside the reaction chamber 2.

The transit of the flow of gas to be treated 4 inside the reaction chamber 2 is facilitated by the presence of directing means 17, of the type of a propeller element, and adapted to define a vacuum for the suction of the gas inside the reaction chamber 2.

Furthermore, the apparatus 1 comprises selection means 25 of the gas to be treated 4, which are arranged upstream, with respect to the direction of forward movement D, of means for the formation 7 of ionizing electrical discharges 8, and adapted to separate the gas to be treated 4 into a plurality of components I, II, III, in turn, comprising at least one of carbon dioxide, carbon monoxide and nitrogen.

With reference to a preferred embodiment, the selection means 25 are adapted to separate the gas to be treated 4 into a first component I, a second component II and at least a third component III, in which the first component I is carbon dioxide, the second component II is carbon monoxide and the third component III is nitrogen.

As an example, the selection means 25 are of the type of polymer membranes.

Alternatively, the selection means 25 are of the type of distillation means.

With reference to the particular embodiment shown in the figures, the apparatus comprises extraction means 26, 27 of at least one component I, II, III of the gas to be treated 4.

Advantageously, the extraction means 26, 27 are arranged in the proximity of the selection means 25.

For example, the extraction means 26, 27 are adapted to extract the nitrogen III, obtained by the separation of the flow of gas to be treated 4 into the components I, II, III, which outflows from the reaction chamber 2 by means of the extraction means 26, 27 arranged in the proximity of the selection means 25.

The extraction means 26, 27 comprise at least an outlet gap 26 for the outflow of the nitrogen III, and at least an extraction duct 27 associated with the outlet gap 26 and adapted to convey the nitrogen III outside the casing 1a.

With reference to the particular embodiment shown in the figures, the extraction means 26, 27 comprise two outlet gaps 26 and two extraction ducts 27 arranged facing one another on opposite sides of the reaction chamber 2.

Alternative embodiments cannot however be ruled out in which the extraction means 26, 27 comprise three, four etc., outlet gaps 26.

The carbon dioxide I and the carbon monoxide II therefore undergo the action of the means for the formation 7 of electrical discharges 8.

Alternative embodiments cannot be ruled out wherein the nitrogen III does not outflow through the extraction means 26, 27 and is conveyed to the means for the formation 7.

The electrical discharges 8 thus obtained are adapted to interact with the flow of gas to be treated 4 to form a plasma state to obtain the flow of treated gas 6. In detail, the electrical discharges 8 are adapted to interact with at least one of carbon dioxide I and carbon monoxide II, substantially crosswise to the direction of forward movement D.

The electrical discharges 8 thus defined cause the ionization of the carbon dioxide I, and/or of the carbon monoxide II respectively coming out of the selection means 25, thus causing its molecular dissociation.

With reference to a preferred embodiment, the electrical discharges 8 interact with both carbon dioxide I and with carbon monoxide II, thus causing the dissociation of both components I, II.

It is worth specifying that within this treatise by "plasma state" is meant a state characterized by the ionization of the flow of gas to be treated 4.

More in detail, the plasma state is formed by a partially ionized gas in which the electrons have greater energy than that of atoms and molecules in the neutral state. The electrons promote high energy plasma chemistry, i.e. the temperature of the ionized gas to be treated 4 is kept low and, at the same time, the energy from the electrical discharge 8 is not dissipated in heat.

Preferably, the apparatus 1 comprises introduction means of catalysts, not shown in the illustrations, and adapted to improve the efficiency and selectivity of the process in order to obtain the high-added value fraction 31 of interest.

More specifically, these catalysts are bimetal catalysts.

In detail, the means for the formation 7 comprise two electrodes 7 opposed to one another and application means 9 for applying a difference in potential onto the electrodes 7.

Preferably, the application means 9 are of the type of a high-voltage generator and are adapted to supply the electrodes 7 with a pulsating voltage.

Advantageously, the pulsating voltage has a voltage of around thousands of volts.

Preferably, the electrical discharges 8 are of the type of pulsed discharges per nanosecond (NRP).

It is specified that in this treatise, by the term "pulsed discharges per nanosecond" is meant a series of electrical discharges having duration of around tens of nanoseconds repeated at a certain predefined frequency.

Such type of discharge determines a non-balance condition in the flow of gas to be treated 4, which is significantly increased with respect to the use of electrical discharges other than pulsed discharges per nanosecond.

It is underlined that the term "non-balance condition" refers to the fact that the energy of the electric field which powers the electrical discharges 8 is not equally distributed among the components of the gas to be treated 4, but on the contrary is channeled into the electrons of the latter.

In fact, under normal conditions, i.e., in the absence of pulsed discharges per nanosecond, the transfer of energy from the electrons to the gas to be treated 4 is very weak when the electrons themselves have low energy, in the presence of pulsed discharges per nanosecond the latter increase their kinetic energy up to values which allow the molecular dissociation of the gas to be treated 4 into the components I, II, III.

In other words, the pulsed discharges per nanosecond yield energy mainly to the electrons which reach an average energy higher than that of the gas to be treated 4, thus determining the non-balance condition.

In this regard, it is underlined that when the energy of the electrons reaches predefined threshold values, the electrons induce the molecular dissociation of the gas to be treated 4 into the components I, II and III, surprisingly increasing the separation efficiency of the apparatus 1 with respect to the use of different types of electrical discharges, in particular in the molecular dissociation of the flow of gas to be treated 4 into the components I, II, III, or in the production of the high-added value fraction 31.

Advantageously, the electrical discharges 8 are of the type of dielectric barrier discharges.

By way of example, FIG. 1 shows an embodiment of the apparatus 1 in which the carbon dioxide I and the carbon monoxide II coming out of the selection means 25 are conveyed to the means for the formation 7 by flowing through a first compartment 28 and a second compartment 29.

In other words, the reaction chamber 2 at the means for the formation 7 has a barrier element 30 adapted to split it into the first compartment 28 and into the second compartment 29.

The first compartment 28 and the second compartment 29 are provided with two electrodes 7, respectively.

It is specified that the number of compartments may vary according to the specific process requirements and to the number of components I, II, III, to be treated.

The apparatus 1 comprises introduction means 10 of a flow of hydrogenated gas H.

By the term "hydrogenated gas" is meant gaseous additives comprising hydrogen such as, e.g., methane or water.

More in detail, the addition of the flow of hydrogenated gas H is necessary in case the flow of gas to be treated 4 comprises only carbon dioxide.

For example, the introduction means 10 are of the type of nozzles associated internally with the reaction chamber 2 in the proximity of the means for the formation 7.

The flow of treated gas 6 coming out of the means for the formation 7 crosses the separation means 36 arranged in the proximity of the outlet opening 5 and adapted to separate the treated gas itself into the high-added value fraction 31 passing through the outlet opening 5 and conveyed to the outside of the reaction chamber 2, and into the waste fraction 32 obtained from the transformation of at least one of the components I, II, III.

According to the invention, the apparatus 1 comprises reintroduction means 33, 34, 35 for reintroducing the waste fraction 32 inside the reaction chamber 2; in detail the reintroduction means 33, 34, 35 are arranged downstream of the means for the formation 7 with respect to the direction of forward movement D. Preferably, the separation means 36 are arranged upstream of the reintroduction means 33, 34, 35 with respect to the direction of forward movement D.

In particular, the selection means 25 and the separation means 36 comprise at least one of polymer membranes and/or distillation means.

In fact, similarly to the selection means 25, the separation means 36 are also of the type of polymer membranes or distillation means.

The reintroduction means 33, 34, 35 comprise an outlet mouth 33 made, with respect to the direction of forward movement D, downstream of the means for the formation 7, a reintroduction duct 34 associated with the outlet mouth 33, and an inlet mouth 35 made upstream of the selection means 25 with respect to the direction of forward movement D.

In order to facilitate the mixing of the waste fraction with the flow of gas to be treated 4, the inlet mouth 21 is made in the proximity of the inlet opening 3.

This means that following the transformation of at least one of the components I, II into the high-added value fraction 31, i.e. into syngas, hydrocarbons, oxygenated compounds, nitrogen compounds, or hydrogen, and their outflow from the reaction chamber 2, there is the total reuse of the waste fraction 32 obtained from such transformation, i.e. carbon dioxide and carbon monoxide, avoiding the dispersion of the latter in the surrounding environment.

The operation of the present invention is as follows.

The flow of gas to be treated 4 enters the reaction chamber 2 through the inlet opening 3.

The gas to be treated 4, by way of example comprising a mixture of carbon dioxide I and carbon monoxide II and nitrogen III, then arrives at the selection means 25, where it is separated into carbon dioxide I, carbon monoxide II and nitrogen III.

As mentioned above, with reference to a preferred embodiment, the nitrogen III flows out of the reaction chamber 2 through the extraction means 26, 27.

Subsequently, the carbon dioxide I and the carbon monoxide II reach the electrodes 7.

The electrical discharges 8 cause ionization and dissociation of the flow of gas to be treated 4 in order to obtain the flow of treated gas 6, more specifically of the type of syngas, hydrocarbons, oxygenated compounds, nitrogen compounds, hydrogen, or other compounds with high-added value.

Alternatively, in the case of the flow of gas to be treated 4 comprising only carbon dioxide I, the latter is added to the flow of hydrogenated gas H and then undergoes the electrical discharges 8.

Following ionization the flow of treated gas 6 therefore forms which, passing through the separation means 36, is separated into the high-added value fraction 31 and the waste fraction 32, of the type of carbon dioxide for example.

At this point, the waste fraction 32 is conveyed to the outlet mouth 33 and then reintroduced into the reaction chamber 2 through the reintroduction duct 34 and passing through the inlet mouth 35.

The high-added value fraction 31, whether this is syngas, hydrocarbons, oxygenated compounds, nitrogen compounds or hydrogen, flows out of the reaction chamber 2 passing through the outlet opening 5.

Furthermore, the present invention relates to a method for gas treatment comprising the following steps.

The method 37 comprises the provision of an apparatus 1.

The apparatus 1 comprises a reaction chamber 2 having an inlet opening 3 and an outlet opening 5.

Subsequently, the method 37 comprises a feeding step 38 of a flow of gas to be treated 4 inside the reaction chamber 2 through the inlet opening 3.

Specifically, the feeding step 38 takes place in a continuous mode, i.e. by continuously feeding the reaction chamber 2 in order to guarantee the continuous generation of the flow of treated gas 6.

Preferably, the flow of gas to be treated 4 comprises at least one of carbon dioxide I, carbon monoxide II, nitrogen III or mixtures thereof.

At this point, the method 37 provides for a selection step 39 of the gas to be treated 4 which is adapted to split it into a plurality of components I, II, III comprising at least one of carbon dioxide I, carbon monoxide II, and nitrogen III.

Nitrogen III separated from carbon dioxide I and from carbon monoxide II flows out of the reaction chamber 2.

The method 37 therefore provides an extraction step 40 of the nitrogen III.

The carbon dioxide I and the carbon monoxide II are then subjected to a formation step 41 of ionizing electrical discharges 8 which are adapted to interact with at least one of carbon dioxide I and carbon monoxide II to form a plasma state for obtaining the flow of treated gas 6 comprising at least a high-added value fraction 31 and at least a waste fraction 32.

Advantageously, the high-added value fraction 31 is selected from the group comprising: syngas, hydrocarbons, oxygenated compounds, nitrogen compounds and hydrogen.

The formation of electrical discharges 8 is performed by means of at least two electrodes 7 opposed to one another and arranged inside the reaction chamber 2. Alternative embodiments cannot however be ruled out in which the electrical discharges 8 are made by means of two, three, four, etc. electrodes 7.

The formation of electrical discharges 8 is performed by supplying the electrodes 7 with a pulsed voltage of the order of tens of thousands of volts.

Simultaneously with the formation of electrical discharges 8, the method comprises an introduction step 43 of a hydrogenated gas H.

The addition of hydrogenated gas H can take place, e.g., by injection of methane gas or by adding water.

In detail, the aforementioned introduction step 43 is carried out by means of introduction means 10 of the type of nozzles associated internally with the reaction chamber 2.

For example, this addition of hydrogenated gas H is necessary in the case where the flow of gas to be treated 4 comprises carbon dioxide I.

Finally, the method 37 comprises a separation step 44 of the flow of treated gas 6 into the high-added value fraction 31 passing through the outlet opening 5, and into the waste fraction 32 obtained from the transformation of at least one of the components I, II, III in the flow of treated gas.

In detail, the high-added value fraction 31 is selected from the group comprising: syngas, hydrocarbons, oxygenated compounds, nitrogen compounds, and hydrogen.

At the same time, the waste fraction 32 is conveyed through the reintroduction means 33, 34, 35 in the reaction chamber 2.

In this regard, the method 37 according to the present invention comprises a reintroduction step 42 of the waste fraction 32 with the flow of gas to be treated 4.

More in detail, the reintroduction means 33, 34, 35 comprise a reintroduction duct 34 which extends outside of the reaction chamber 2 and provided with an outlet mouth 33 formed in the proximity of the separation means 36 and with an inlet mouth 35 formed in the proximity of the inlet opening 3.

The feeding step 38, the formation step 41, and the reintroduction step 42 are repeated in sequence.

Specifically, the feeding step 38, the selection step 39, the formation step 41, the separation step 44 and the reintroduction step 42 are repeated in sequence.

Finally, the method comprises an outflow step 45 of the high-added value fraction 31 through the outlet opening 5.

It has in practice been ascertained that the described invention achieves the intended objects.

It is underlined that the special solution of providing for the presence of two electrodes adapted to produce dielectric barrier discharges, or alternatively pulsed discharges per nanosecond, permits treating gases containing pollutants, obtaining products with high-added value or gases reusable in combustion processes.

To this must be added the fact that the special solution of providing dielectric barrier discharges, or alternatively pulsed discharges per nanosecond, permits realizing a plasma state of the gas to be treated the energy of which is controlled according to process needs.

Furthermore, the fact of treating the combustion gas and its conversion into a gas which can be used again permits significantly reducing emissions of carbon dioxide into the atmosphere.

Finally, the fact of providing for the synergic combination of means for the formation of electrical discharges with means for selecting the gas to be treated and reintroduction means permits making the gas treatment, avoiding the emission of carbon dioxide and carbon monoxide into the surrounding environment and at the same time forming treated gases of the type of hydrocarbons, oxygenated compounds, syngas, nitrogen compounds and hydrogen.

The invention claimed is:

1. An Apparatus for the gas treatment, wherein said Apparatus comprises:
    at least a reaction chamber, wherein said reaction chamber comprising:
        at least an inlet opening of a flow of gas to be treated comprising at least one of carbon dioxide, carbon monoxide, nitrogen or mixtures thereof;
        means for the formation of ionizing electrical discharges configured to form a plasma state for obtaining a flow of treated gas comprising at least a high-added value fraction selected from the group comprising: syngas, hydrocarbons, oxygenated compounds, nitrogen compounds and hydrogen, and at least a waste fraction comprising the at least one of carbon dioxide and carbon monoxide;
        at least an outlet opening of said high-added value fraction arranged downstream of said means for the formation with respect to the direction of forward movement of the flow of gas to be treated inside said reaction chamber; and
        selection means of said flow of gas to be treated, arranged upstream of said means for the formation, with respect to said direction of forward movement, and adapted to separate the gas to be treated into a plurality of components comprising the at least one of carbon dioxide, carbon monoxide, and nitrogen; and
    reintroduction means for reintroducing said waste fraction inside said reaction chamber, said reintroduction means being arranged downstream of said means for the formation with respect to said direction of forward movement, wherein said reintroduction means comprising:
        an outlet mouth made, with respect said direction of forward movement, downstream of said means for the formation;
        a reintroduction duct associated with said outlet mouth, and
        an inlet mouth made upstream of said selection means with respect said direction of forward movement; and
    wherein said reaction chamber further comprising:
        separation means arranged upstream of said reintroduction means, with respect to said direction of forward movement, in the proximity of said outlet opening, and adapted to separate said flow of treated gas into said high-added value fraction passing through said outlet opening and conveyed to the outside of said reaction chamber, and into said waste fraction passing through said reintroduction means.

2. The Apparatus accord to claim 1, further comprising:
introduction means of a flow of hydrogenated gas which are positioned in the proximity of said means for the formation.

3. The Apparatus according to claim 1, wherein said means for the formation comprise at least two electrodes opposed to one another and application means for applying a difference in potential onto said electrodes.

4. The Apparatus according to claim 1, wherein said electrical discharges are of the type of dielectric barrier discharges.

5. The Apparatus according to claim 1, wherein said electrical discharges are of the type of pulsed discharges per nanosecond.

6. The Apparatus according to claim 1, further comprising:
introduction means of bimetal catalysts.

7. The Apparatus according to claim 1, wherein
said selection means and said separation means comprise at least one of polymer membranes and/or distillation means.

8. A Method for the gas treatment comprising:
a) providing a treatment apparatus comprising at least a reaction chamber having at least an inlet opening and at least an outlet opening;
b) feeding of a flow of gas to be treated inside said reaction chamber through said inlet opening, said flow of gas to be treated comprising at least one of carbon dioxide, carbon monoxide, nitrogen or mixtures thereof,
c) forming ionizing electrical discharges adapted to interact with said gas to be treated to form a plasma state for obtaining a flow of treated gas comprising at least a high-added value fraction and at least a waste fraction;
d) reintroducing said waste fraction in said feeding step;
e) outflowing said high-added value fraction through said outlet opening; and
f) separating said flow of treated gas into at least said high-added value fraction and into said waste fraction conveyed through reintroduction means outside of said reaction chamber, said high-added value fraction being selected from the group comprising: syngas, hydrocarbons, oxygenated compounds, nitrogen compounds and hydrogen, and said waste fraction comprises the at least one of carbon dioxide and carbon monoxide.

9. The Method according to claim 8, further comprising:
a selecting step of said gas to be treated adapted to split said gas to be treated into a plurality of components comprising the at least one of carbon dioxide, carbon monoxide and nitrogen.

10. The Method according to claim 8, wherein
said feeding step takes place in a continuous mode, by repeating in sequence said selection step, said formation step, said reintroduction step and said outflow step.

11. The Method according to claim 9, further comprising:
at least an introducing step of introducing a hydrogenated gas, said introducing step being subsequent to said selection selecting step.

12. The Method according to claim 8, wherein
said forming step of electrical discharges is performed by means of at least two electrodes opposed to one another and positioned inside said reaction chamber.

13. The Method according to claim 8, wherein
said electrical discharges are of the type of dielectric barrier discharges.

14. The Method according to claim 8, wherein
said electrical discharges are of the type of pulsed discharges per nanosecond.

15. The Method according to claim 8, further comprising:
at least an introducing step of introducing bimetal catalysts.

* * * * *